US012706373B2

(12) United States Patent
Choi et al.

(10) Patent No.: US 12,706,373 B2
(45) Date of Patent: Aug. 11, 2026

(54) WEARABLE ELECTRONIC DEVICE COMPRISING ANTENNA

(71) Applicant: Samsung Electronics Co., Ltd., Suwon-si (KR)

(72) Inventors: Donguk Choi, Suwon-si (KR); Yongjoo Shin, Suwon-si (KR); Jeonghoon Kim, Suwon-si (KR); Yoseb Oh, Suwon-si (KR); Jaebong Chun, Suwon-si (KR); Inyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 18/678,487

(22) Filed: May 30, 2024

(65) Prior Publication Data

US 2024/0322421 A1 Sep. 26, 2024

Related U.S. Application Data

(63) Continuation of application No. PCT/KR2022/017010, filed on Nov. 2, 2022.

(30) Foreign Application Priority Data

Nov. 30, 2021 (KR) ........................ 10-2021-0168175

(51) Int. Cl.
*H01Q 1/27* (2006.01)
*H01Q 1/38* (2006.01)
*H01Q 7/00* (2006.01)

(52) U.S. Cl.
CPC ............... *H01Q 1/273* (2013.01); *H01Q 1/38* (2013.01); *H01Q 7/00* (2013.01)

(58) Field of Classification Search
CPC ............ H01Q 1/273; H01Q 1/38; H01Q 7/00; H01Q 9/42; H01Q 1/245; H04R 2420/07; H04R 1/1041; H04R 1/1016
See application file for complete search history.

(56) References Cited

U.S. PATENT DOCUMENTS 10,764,666 B1 * 9/2020 Napoles .................. H01Q 7/00
2017/0047641 A1 2/2017 Kim et al.
(Continued)

FOREIGN PATENT DOCUMENTS

CN 208273204 U 12/2018
CN 112135215 A 12/2020
(Continued)

OTHER PUBLICATIONS

Extended European Search Report dated Jan. 27, 2025 issued in European Patent Application No. 22901593.8.
(Continued)

*Primary Examiner* — David E Lotter

(74) *Attorney, Agent, or Firm* — Nixon & Vanderhye, P.C.

(57) ABSTRACT

According to various embodiments, a wearable electronic device includes: a housing, a first conductive pattern disposed in an internal space of the housing, at least one second conductive pattern disposed within a specified distance of the first conductive pattern, a wireless communication circuit disposed in the internal space and configured to transmit and/or receive a radio signal in a designated frequency band through the first conductive pattern, and a touch sensor module disposed in the internal space and configured to detect a touch on the housing through the first conductive pattern. The second conductive pattern may be disposed at a position capable of being capacitively coupled with the first conductive pattern upon the touch.

18 Claims, 20 Drawing Sheets

(56) References Cited

U.S. PATENT DOCUMENTS

| | | | | |
|---|---|---|---|---|
| 2017/0093079 | A1 | 3/2017 | Wagman et al. | |
| 2017/0195768 | A1 | 7/2017 | Kim et al. | |
| 2020/0091590 | A1 | 3/2020 | Su et al. | |
| 2021/0044885 | A1* | 2/2021 | Fukahori ................ | H01Q 1/273 |
| 2021/0089265 | A1 | 3/2021 | Van Erven et al. | |
| 2021/0250676 | A1 | 8/2021 | Kim et al. | |
| 2021/0270639 | A1* | 9/2021 | Chen .................... | H03K 17/962 |
| 2022/0361319 | A1 | 11/2022 | Park et al. | |

FOREIGN PATENT DOCUMENTS

| | | | |
|---|---|---|---|
| JP | 2021029006 | A | 2/2021 |
| KR | 20170019846 | A | 2/2017 |
| KR | 20170082101 | A | 7/2017 |
| KR | 20200019660 | A | 2/2020 |
| KR | 20210099970 | A | 8/2021 |
| KR | 20210101597 | A | 8/2021 |

OTHER PUBLICATIONS

International Search Report for PCT/KR2022/017010 mailed Feb. 13, 2023, 12 pages.

Written Opinion of the ISA for PCT/KR2022/017010 mailed Feb. 13, 2023, 5 pages.

Office Action dated Mar. 20, 2026 in Korean Application No. 10-2021-0168175 with English-language translation.

* cited by examiner

WEARABLE ELECTRONIC DEVICE COMPRISING ANTENNA

CROSS-REFERENCE TO RELATED APPLICATIONS

This application is a continuation of International Application No. PCT/KR2022/017010 designating the United States, filed on Nov. 2, 2022, in the Korean Intellectual Property Receiving Office, and claiming priority to Korean Patent Application No. 10-2021-0168175, filed on Nov. 30, 2021, in the Korean Intellectual Property Office, the disclosures of each of which are incorporated by reference herein in their entireties.

BACKGROUND

Field

The disclosure relates to a wearable electronic device including an antenna.

Description of Related Art

An electronic device may include a wearable electronic device that can be worn on a part of the user's body to improve portability or user accessibility. The wearable electronic device may include an ear wearable electronic device that is worn on the user's ear to listen to music or provide convenience in making a phone call. The wearable electronic device may include at least one antenna for transmitting or receiving data with an external device (e.g., a mobile terminal). There may be a need for a design to reduce radiation performance degradation even in the case where at least one antenna is attached to the user's body.

The wearable electronic device, especially the ear wearable electronic device, may include a touch sensing circuit for detecting a touch input. For example, the touch sensing circuit may have at least one conductive pattern disposed adjacent to a housing that forms the exterior of the wearable electronic device. This conductive pattern can also be used as an antenna pattern to overcome mounting limitations in the wearable electronic device. For example, while worn on the user's ear, the wearable electronic device can recognize a touch input by detecting a state in which the human body (e.g., a finger) is in contact with or is close to the housing.

However, when the user's finger comes into contact with the housing for a touch input, the antenna's radiation performance may deteriorate. Due to this deterioration in radiation performance, the wearable electronic devices may cause malfunction such as sound interruption.

SUMMARY

Embodiments of the disclosure may provide a wearable electronic device including an antenna configured to reduce radiation performance degradation even when a human body (e.g., finger) is contacted or approached.

Embodiments of the disclosure may provide an electronic device including an antenna in which malfunction can be reduced even when a human body is in contact or proximity.

According to various example embodiments, a wearable electronic device includes: a housing, a first conductive pattern disposed in an internal space of the housing, at least one second conductive pattern disposed near the first conductive pattern, a wireless communication circuit disposed in the internal space and configured to transmit and/or receive a radio signal in a designated frequency band through the first conductive pattern, and a touch sensor module comprising touch sensing circuitry disposed in the internal space and configured to detect a touch on the housing through the first conductive pattern, wherein the second conductive pattern may be disposed at a position capable of being capacitively coupled with the first conductive pattern upon the touch.

According to various example embodiments, a wearable electronic device includes: a housing including a first case and a second case combined with the first case, a substrate disposed in an internal space of the housing, an antenna carrier disposed between the substrate and the first case in the internal space, a first conductive pattern disposed on the antenna carrier, at least one second conductive pattern disposed within a specified distance of the first conductive pattern on the antenna carrier, a wireless communication circuit disposed on the substrate and configured to transmit and/or receive a radio signal in a designated frequency band through the first conductive pattern, and a touch sensor module comprising touch sensing circuitry disposed on the substrate and configured to detect a touch on the first case through the first conductive pattern, wherein the second conductive pattern may be disposed at a position capable of being capacitively coupled with the first conductive pattern upon the touch.

According to various example embodiments, a wearable electronic device includes: a housing, a first conductive pattern disposed in an internal space of the housing, at least one second conductive pattern disposed within a specified distance of the first conductive pattern, and a wireless communication circuit disposed in the internal space and configured to transmit and/or receive a radio signal in a designated frequency band through the first conductive pattern, wherein the second conductive pattern may be disposed at a position capable of being capacitively coupled with the first conductive pattern when a human body contacts or approaches the housing.

A wearable electronic device according to various example embodiments of the disclosure includes a second conductive pattern independently disposed near a first conductive pattern that is used for both a touch sensor and an antenna radiator. The second conductive pattern is induced to be capacitively coupled with the first conductive pattern when contacted by the human body. This can minimize or reduce a current path through the first conductive pattern caused by human body contact, thereby reducing the radiation performance degradation and the device malfunction.

In addition, various effects explicitly or implicitly appreciated through the disclosure may be provided.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
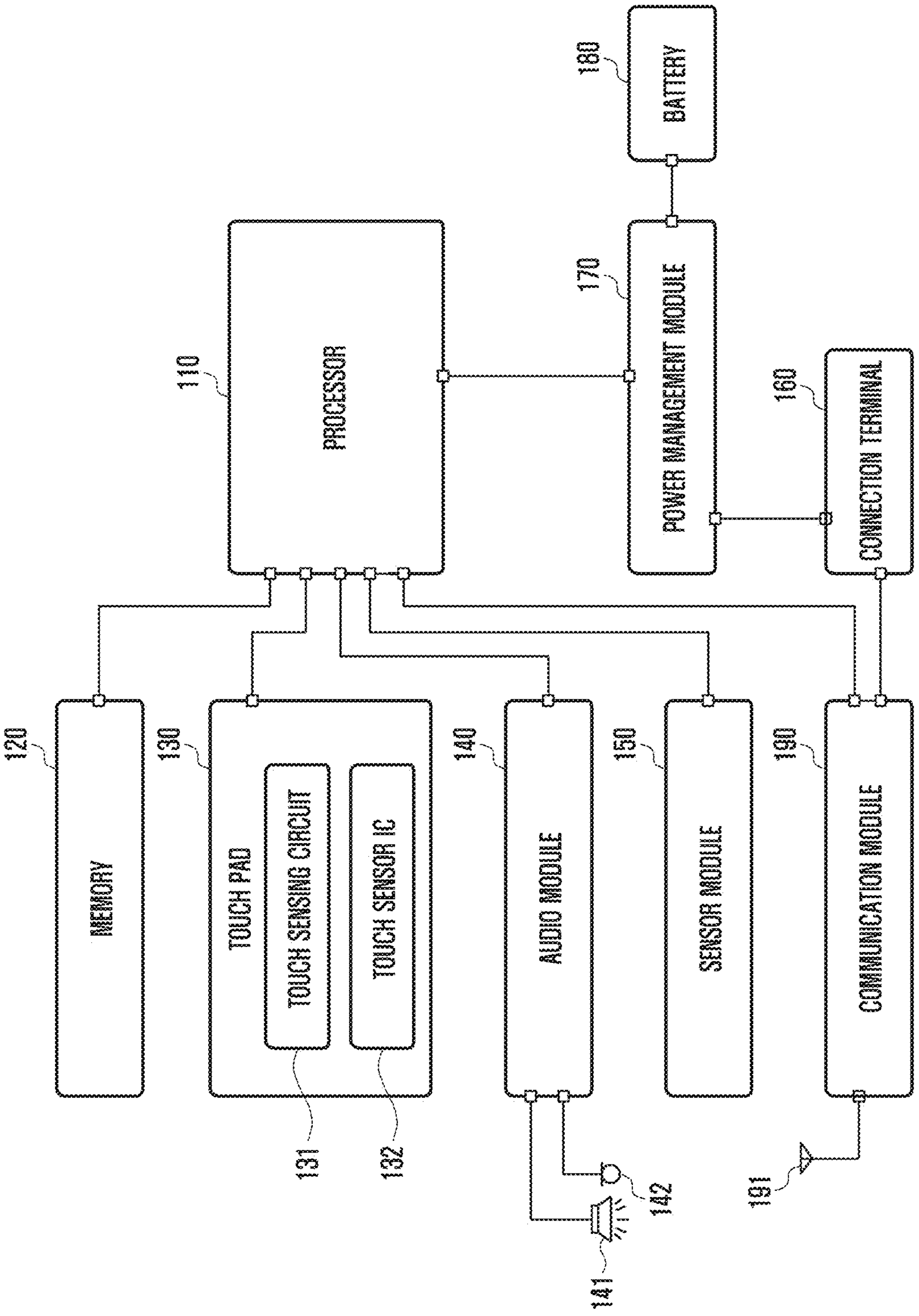
FIG. 1 is a block diagram illustrating an example configuration of a wearable electronic device according to various embodiments.

FIG. 1 is a block diagram illustrating an example configuration of a wearable electronic device according to various embodiments.

With reference to FIG. 1, the wearable electronic device 100 may include a processor (e.g., including processing circuitry) 110, a memory 120, a touch pad 130, an audio module (e.g., including audio circuitry) 140, a speaker 141, a microphone 142, a sensor module (e.g., including at least one sensor) 150, a connection terminal 160, a power management module (e.g., including power management circuitry) 170, a battery 180, a communication module (e.g., including communication circuitry) 190, and/or at least one antenna 191. According to various embodiments, the wearable electronic device 100 may omit at least one of the components shown in FIG. 1 or add one or more other components. According to various embodiments, some of these components may be implemented as a single integrated circuit.

The processor 110 may include various processing circuitry and control at least one other component (e.g., a hardware or software component) of the wearable electronic device 100 connected to the processor 110 and perform various data processing or computations by executing software, for example. According to an embodiment, as at least part of data processing or computations, the processor 110 may load a command or data received from other component (e.g., the sensor module 150 or the communication module 190) into a volatile memory of the memory 120, process the command or data stored in the volatile memory, and store the resulting data in a non-volatile memory. The processor 110 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The memory 120 may store, for example, various data used by at least one component (e.g., the processor 110 or the sensor module 150) of the wearable electronic device 100. Such data may include, for example, software (e.g., a program) and input or output data on commands related thereto. The memory 120 may include a volatile memory or a non-volatile memory. A program may be stored in the memory 120 as software and may include, for example, an operating system, middleware, or an application. The memory 120 may store, for example, instructions related to various operations performed by the processor 110.

According to various embodiments, the touch pad 130 may, for example, include a pointing device that utilizes the outer surface of a housing (e.g., the housing 210 in FIG. 2) and may include a touch sensing circuit 131 and a touch sensor IC 332. According to an embodiment, the touch sensing circuit 131 may include a conductive pattern (e.g., a first conductive pattern 2241 in FIG. 5A) located within the housing (e.g., the housing 210 in FIG. 2). The housing (e.g., the housing 210 in FIG. 2) formed of a non-conductive material may be positioned to at least partially overlap with the touch sensing circuit 131. At least a portion of the outer surface of the housing (e.g., the housing 210 in FIG. 2) may be used as an input area (or a key area) for receiving or detecting a user input (e.g., a touch input). According to an embodiment, the touch pad 130 may be implemented based on a capacitance scheme. The touch sensor IC 132 (e.g., a touch controller integrated circuit (IC)) may apply a voltage to the touch sensing circuit 131, and then the touch sensing circuit 131 may form an electromagnetic field. For example, if a finger touches a portion of the housing (e.g., the housing 210 in FIG. 2) or approaches within a threshold distance, a change in capacitance based on a change in the electromagnetic field may be above the threshold. When the change in capacitance exceeds the threshold, the touch sensor IC 132 may generate an electrical signal related to coordinates as a valid user input and transmit it to the processor 110. The processor 110 may recognize the coordinates based on the electrical signal received from the touch sensor IC 132. Both the touch sensing circuit 131 and the touch sensor IC 132 may be referred to as a sensor circuit for touch detection.

According to various embodiments, the touch sensor IC 132 may convert an analog signal obtained through the touch sensing circuit 131 into a digital signal. According to various embodiments, the touch sensor IC 132 may perform various functions such as noise filtering, noise removal, or sensing data extraction in relation to the touch sensing circuit 131. According to an embodiment, the touch sensor IC 132 may include various circuits such as an analog-digital converter (ADC), a digital signal processor (DSP), and/or a micro control unit (MCU).

According to various embodiments, a user input regarding audio data (or audio content) may be generated through the touch pad 130. For example, functions such as playback start of audio data, playback pause, playback stop, playback speed control, playback volume control, or mute may be executed based on a user input through the touch pad 130. According to an embodiment, various gesture inputs using a finger may be possible through the housing (e.g., the housing 210 in FIG. 2), and various functions related to audio data may be performed based on such gesture inputs. For example, with a single tap, the processor 110 may start the playback of audio data or pause the playback. For example, with two taps, the processor 110 may switch playback to the next audio data. For example, with three taps, the processor 110 may switch playback to the previous audio data. For example, with swiping, the processor 110 may adjust the volume related to the playback of audio data. Such gesture inputs may be used not only for functions related to audio data, but also for various other functions. For example, when receiving a call, the processor 110 may perform a call connection operation through two taps.

According to various embodiments, the touch pad 130 may further include a tactile layer (not shown). The touch pad 130 including the tactile layer may provide a tactile response to the user. According to various embodiments, a key button (not shown) aligned with the touch pad 130 may be additionally disposed, and when the housing (e.g., the housing 210 in FIG. 2) is pressed, an input such as clicking a mouse key button may be generated. According to an embodiment, the touch pad 130 may further include or be replaced with a sensor circuit (e.g., a pressure sensor) (not shown) configured to measure the intensity of force generated by a user input.

According to various embodiments, not limited to the touch pad 130, the wearable electronic device 100 may further include various other input devices for receiving, from the outside (e.g., the user) of the wearable electronic device 100, commands or data to be used in a component (e.g., the processor 110) of the wearable electronic device 100. These input devices may include a variety of input devices such as a physical key button or an optical key.

According to various embodiments, the speaker 141 may output, for example, an audio signal to the outside of the wearable electronic device 100. An acoustic signal, such as sound or voice, may flow into the microphone 142, and the microphone 142 may generate a corresponding electrical signal. The audio module 140 may convert sound into an electrical signal or, conversely, convert an electrical signal into sound. The audio module 140 may acquire sound through the microphone 142 or output sound through the speaker 141. According to an embodiment, the audio module 140 may support an audio data collection function. The audio module 140 may play the collected audio data. The audio module 140 may include various audio circuitry including, for example, and without limitation, an audio decoder, a digital-to-analog (D/A) converter, or an analog-to-digital (A/D) converter. The audio decoder may convert audio data stored in the memory 120 into a digital audio signal. The D/A converter may convert the digital audio signal converted by the audio decoder into an analog audio signal. The speaker 141 may output the analog audio signal converted by the D/A converter. The A/D converter may convert an analog audio signal obtained through the microphone 142 into a digital audio signal.

According to various embodiments, the sensor module 150 may include at least one sensor and detect, for example, an operating state (e.g., power or temperature) of the wearable electronic device 100 or an external environmental state, and generate an electrical signal or data value corresponding to the detected state. According to an embodiment, the sensor module 150 may include an acceleration sensor, a gyro sensor, a geomagnetic sensor, a magnetic sensor, a proximity sensor, a temperature sensor, a gesture sensor, a grip sensor, or a biometric sensor. For example, the wearable electronic device 100 may include at least one optical sensor capable of detecting the external environment through at least a portion of the housing (e.g., the housing 210 in FIG. 2). According to an embodiment, the processor 110 may transmit an electrical signal acquired from the optical sensor to an external electronic device (e.g., a smartphone) through the communication module 190. The external electronic device may acquire various kinds of biometric information such as heart rate or skin temperature based on electrical signals obtained from the wearable electronic device 100. According to various embodiments, the processor 110 may acquire biometric information based on an electrical signal obtained from the optical sensor, and transmit the acquired biometric information to the external electronic device through the communication module 190 or output it through the speaker 141. According to an embodiment, through the sensor module 150, the processor 110 may acquire information or a signal about whether the wearable electronic device 100 is worn on the user's ear. According to an embodiment, through the sensor module 150, the processor 110 may acquire information or a signal about whether the wearable electronic device 100 is combined with an external device (e.g., a charging device).

According to various embodiments, the wearable electronic device 100 may include a sensing target member corresponding to a sensor of an external electronic device (e.g., a charging device). For example, the external electronic device may include a Hall IC disposed in a mounting portion, and the wearable electronic device 100 may include a magnet (or magnetic material). When the wearable electronic device 100 is combined with the mounting portion of the external electronic device, the Hall IC of the external electronic device may detect the magnet placed in the wearable electronic device 100, and transmit an electrical signal related to the combination of the external electronic device and the wearable electronic device to the processor 110.

According to various embodiments, the connection terminal 160 may include a connector through which the wearable electronic device 100 can be electrically connected to an external electronic device (e.g., a smart phone or a charging device). According to an embodiment, the connection terminal 160 may include, for example, a USB connector or an SD card connector. According to an embodiment, the connection terminal 160 may include at least one conductive contact (or terminal) disposed on the outer surface of the housing (e.g., the housing 210 in FIG. 2). For example, when the wearable electronic device 100 is mounted in the mounting portion (not shown) of the external electronic device, the at least one conductive contact of the wearable electronic device 100 may be electrically connected to at least one conductive contact (e.g., pogo pin) disposed in the mounting portion of the external electronic device. According to an embodiment, the connection terminal 160 may receive power for charging the battery 180 from the external electronic device and transmit it to the power management module 170. According to an embodiment, the wearable electronic device 100 may perform power line communication (PLC) with the external electronic device (e.g., a charging device) through the connection terminal 160. According to an embodiment, the power management module 170 may manage power supplied to the wearable electronic device 100, for example. According to an embodiment, the power management module 170 may be implemented as at least a part of a power management integrated circuit (PMIC). According to an embodiment, the battery 180 may supply power to at least one component of the wearable electronic device 100, for example. According to an embodiment, the battery 180 may include a rechargeable secondary battery.

According to various embodiments, the communication module 190 may include various communication circuitry and support, for example, establishing a direct (e.g., wired) communication channel or a wireless communication channel between the wearable electronic device 100 and an external electronic device (e.g., a server, a smartphone, a personal computer (PC), a personal digital assistant (PDA), or an access point), and performing communication through the established communication channel. According to an embodiment, the communication module 190 may operate independently of the processor 110 and may include one or more communication processors including various communication processing circuitry that support direct (e.g., wired) communication or wireless communication.

According to various embodiments, the communication module 190 may transmit and/or receive, for example, a signal or power to or from an external electronic device through at least one antenna 191 (or antenna radiator). According to an embodiment, the communication module 190 may include a wireless communication module (e.g., a short-range wireless communication module or a global navigation satellite system (GNSS) communication module) or a wired communication module (e.g., a local area network (LAN) communication module or a power line communication module). Among these communication modules, the corresponding communication module may communicate with an external electronic device through a first network (e.g., a short-range communication network such as Bluetooth, Bluetooth low energy (BLE), near field communication (NFC), wireless fidelity (WiFi) direct, or infrared data association (IrDA)) or a second network (e.g., a long-distance communication network such as Internet or a computer network such as LAN or wide area network (WAN)). These various types of communication modules may be integrated into one component (e.g., a single chip) or implemented as a plurality of separate components (e.g., multiple chips). According to an embodiment, the wearable electronic device 100 may include a plurality of antennas, and the communication module 190 may select at least one antenna suitable for a communication scheme used in a communication network from among the plurality of antennas. Signals or power may be transmitted or received between the communication module 190 and an external electronic device through the selected at least one antenna. According to an embodiment, at least one antenna among the plurality of antennas may be configured to transmit or receive a radio signal using at least one conductive pattern used as the touch pad 130.

According to various embodiments, all or part of the operations performed in the wearable electronic device 100 may be executed in at least one external electronic device (e.g., a smartphone). For example, in the case where the wearable electronic device 100 needs to perform a certain function or service automatically or in response to a request from a user or another device, the wearable electronic device 100 may request at least one external electronic device to perform at least part of the function or service, instead of or in addition to executing the function or service by itself. The at least one external electronic device that has received this request may execute at least part of the requested function or service or an additional function or service related to the request, and transmit the result of execution to the wearable electronic device 100. The wearable electronic device 100 may provide the result, as is or further processed, as at least part of a response to the request.

According to various embodiments, commands or data received by the processor 110 may be transmitted or received between the wearable electronic device 100 and an external electronic device (e.g., a smartphone) through a server connected to the second network (e.g., a long-distance communication network such as Internet or a computer network such as LAN or WAN).

According to various embodiments, the processor 110 may be configured to control various signal flows related to audio data and control information collection and output. The processor 110 may be configured to receive audio data from an external electronic device (e.g., a server, a smartphone, a PC, a PDA, or an access point) through the communication module 190 and store the received audio data in the memory 120. The processor 110 may be configured to receive non-volatile audio data (or downloaded audio data) from the external electronic device and store the received non-volatile audio data in the non-volatile memory. The processor 110 may be configured to receive volatile audio data (or streaming audio data) from the external electronic device and store the received volatile audio data in the volatile memory.

According to various embodiments, the processor 110 may be configured to reproduce audio data (e.g., non-volatile audio data or volatile audio data) stored in the memory 120 and output it through the speaker 141. For example, the audio module 140 may decode audio data to generate an audio signal that can be output through the speaker 141 (e.g., play audio data), and the generated audio signal may be output through the speaker 141.

According to various embodiments, the processor 110 may be configured to receive an audio signal from an external electronic device and output the received audio signal through the speaker 141. For example, the external electronic device (e.g., an audio playback device) may decode audio data to generate an audio signal, and transmit the generated audio signal to the wearable electronic device 100.

According to various embodiments, a mode in which the wearable electronic device 100 reproduces volatile audio data or non-volatile audio data stored in the memory 120 and outputs it through the speaker 141 may be paused when a state where the wearable electronic device 100 is not worn on the user's ears is identified through the sensor module 150. When a state where the wearable electronic device 100 is worn on the user's ear is identified through the sensor module 150, the mode may be resumed. According to an embodiment, a mode in which an audio signal is received from an external electronic device and output through the speaker 141 may be paused when a state where the wearable electronic device 100 is not worn on the user's ear is identified through the sensor module 150. When a state where the wearable electronic device 100 is worn on the user's ear is identified through the sensor module 150, the mode may be resumed. According to an embodiment, when the wearable electronic device 100 is connected to another wearable electronic device (not shown), one wearable electronic device may become a master device and the other wearable electronic device may become a slave device. For example, the wearable electronic device 100, which is a master device, may not only output audio signals received from an external electronic device (e.g., a smartphone) to the speaker 141, but also transmit them to other wearable electronic device. Such other wearable electronic device may be implemented substantially the same as the wearable electronic device 100 and may output audio signals received from the wearable electronic device 100 through a speaker.

According to various embodiments, the wearable electronic device 100 may provide a voice recognition function that generates a voice command from an analog audio signal received through the microphone 142. Such voice commands may be used for various functions related to audio data. According to various embodiments, the wearable electronic device 100 may include a plurality of microphones (e.g., the microphone 142) to detect the direction of sound. At least some of the plurality of microphones may be utilized for a noise-cancelling function.

Figure 2:
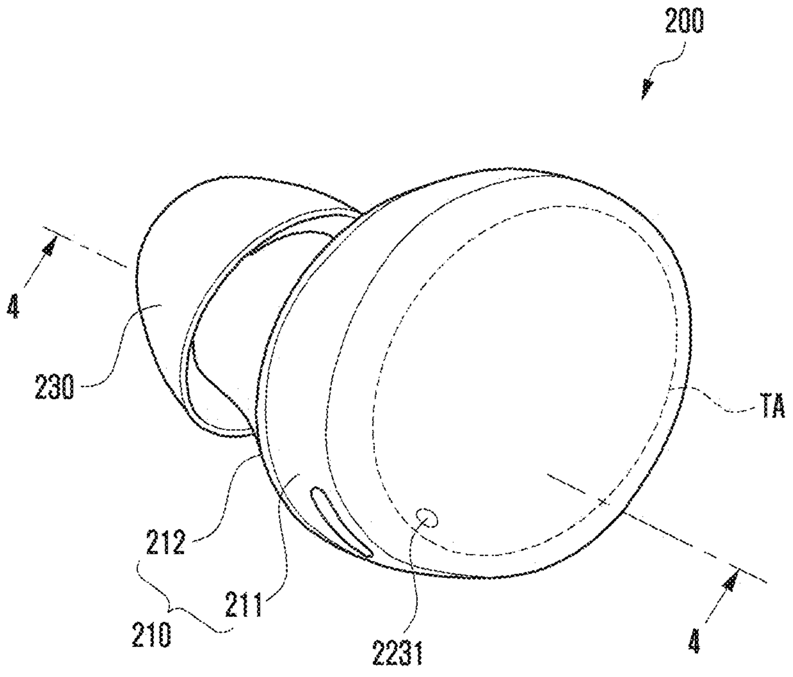
FIG. 2 is a perspective view of a wearable electronic device according to various embodiments.

FIG. 2 is a perspective view of a wearable electronic device according to various embodiments.

The electronic device 200 of FIG. 2 may be at least partially similar to the electronic device 100 of FIG. 1 or may include a different embodiment of the electronic device.

With reference to FIG. 2, the electronic device 200 may include a housing 210 including a first case 211 and a second case 212 combined with the first case 211, and an ear tip 230 detachably combined with the housing 210. According to an embodiment, the ear tip 230 may be detachably combined with the second case 212. According to an embodiment, the housing 210 may be formed in a shape that can be worn on the user's ear at least in part. According to an embodiment, the ear tip 230 may be formed of an elastic material (e.g., rubber or silicone) having a size that can be inserted into the user's ear (e.g., external auditory canal). According to an embodiment, the housing 210 may include an area exposed to the outside when worn on the user's ear. According to an embodiment, the housing 210 may include a microphone 2231 disposed in at least a portion of an area exposed to the outside to receive external sound. According to an embodiment, the housing 210 may include a touch area (TA) disposed in at least a portion of the area exposed to the outside.

According to various embodiments, the electronic device 200 may include a first conductive pattern (e.g., the first conductive pattern 2241 in FIG. 5A or the touch sensing circuit 131 in FIG. 1) disposed in an area corresponding to the touch area TA in an internal space (e.g., the internal space 2001 in FIG. 4) of the housing 210. According to an embodiment, the first conductive pattern 2241 may be electrically connected to a touch sensor module (e.g., the touch sensor IC 132 in FIG. 1) disposed inside the electronic device 200. According to an embodiment, the touch sensor module may detect a change in capacitance due to contact of the human body (e.g., a finger) with the touch area TA of the housing 210, and send a detected signal to a processor (e.g., the processor 110 in FIG. 1) of the electronic device 200. According to an embodiment, the electronic device 200 may include an antenna using the first conductive pattern (e.g., the first conductive pattern 2241 in FIG. 3) used to detect a touch input. According to an embodiment, the antenna may be configured to transmit and/or receive radio signals in a designated frequency band (e.g., a frequency band ranging from approximately 600 MHz to 6000 MHZ).

According to various embodiments of the disclosure, the electronic device 200 may include at least one second conductive pattern (e.g., the second conductive pattern 2242 in FIG. 3) (e.g., a dummy pattern or a parasitic pattern) disposed near (e.g., within a specified distance of) the first conductive pattern 2241. According to an embodiment, the at least one second conductive pattern 2242 may be capacitively coupled with the first conductive pattern 2241 through a user's touch input, thereby minimizing and/or reducing a current path of the antenna (e.g., an electrical length of the antenna), which can be lengthened by a finger touch, and thus helping to reduce radiation performance degradation.

Figure 3:
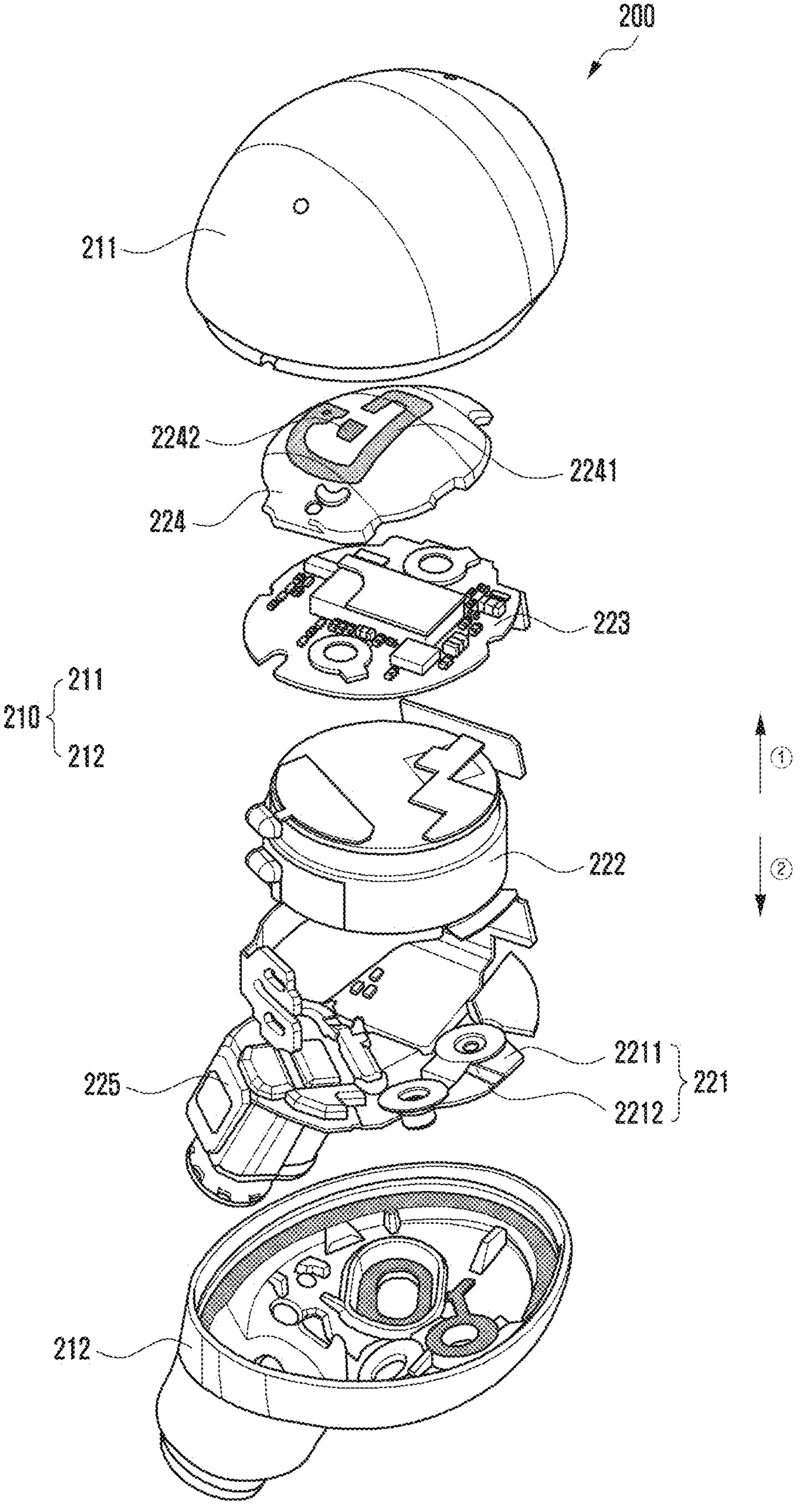
FIG. 3 is an exploded perspective view of a wearable electronic device according to various embodiments.
Figure 4:
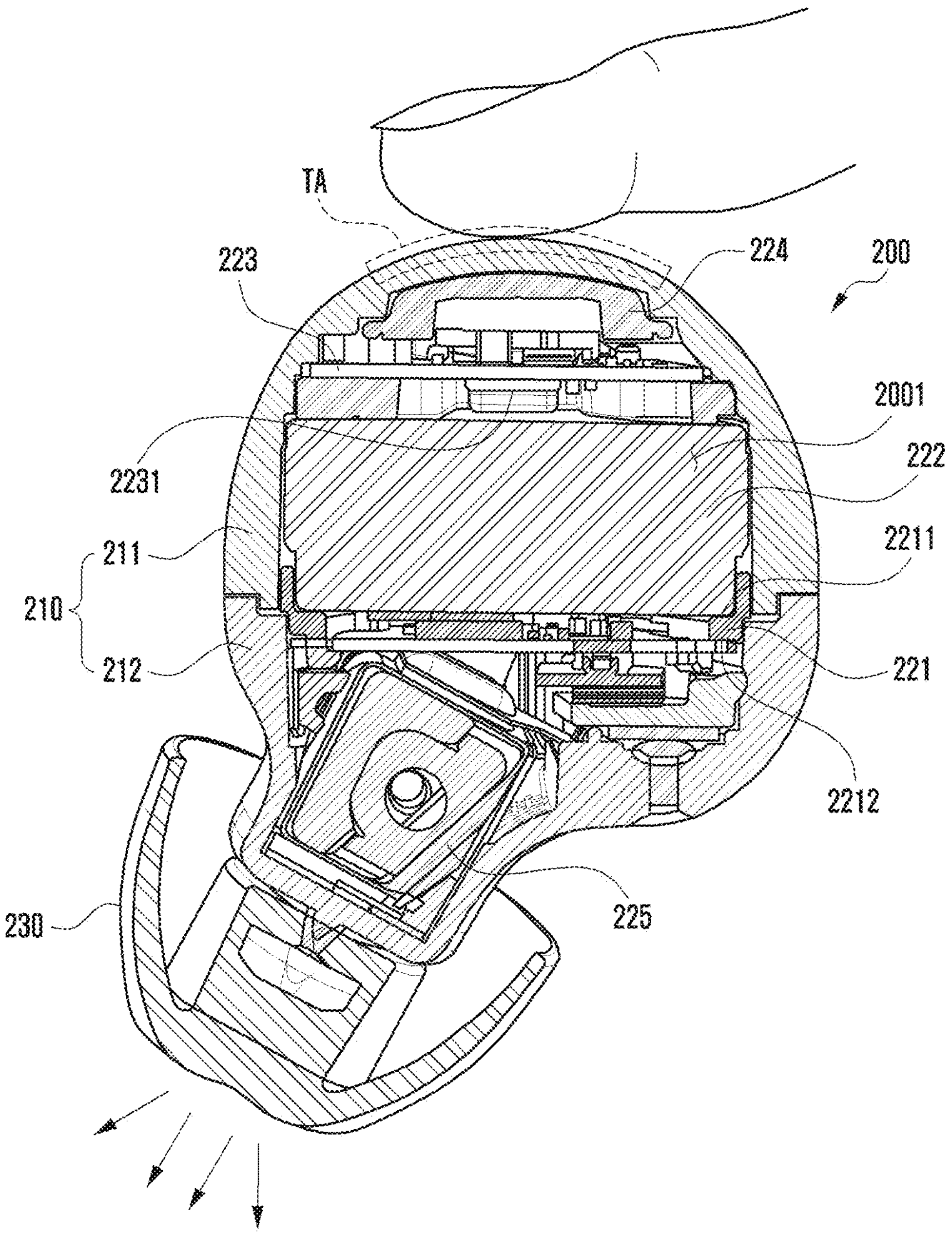
FIG. 4 is a cross-sectional view of a wearable electronic device taken along line 4-4 of FIG. 2, according to various embodiments.

FIG. 3 is an exploded perspective view of a wearable electronic device according to various embodiments. FIG. 4 is a cross-sectional view of a wearable electronic device taken along line 4-4 of FIG. 2, according to various embodiments.

With reference to FIGS. 3 and 4, the electronic device 200 (e.g., the electronic device 100 in FIG. 1) may include the housing 210 including the first case 211 and the second case 212 combined with the first case 211, and the ear tip 230 detachably combined with the housing 210. According to an embodiment, the electronic device 200 may include a bracket 221 disposed in the internal space 2001 of the housing 210 and having a first surface 2211 facing a first direction (e.g., direction ① in FIG. 3) and a second surface 2212 facing a second direction (e.g., direction ② in FIG. 3), a substrate 223 disposed on the first surface 2211 of the bracket 221, and an antenna carrier 224 disposed between the substrate 223 and the first case 211. According to an embodiment, the electronic device 200 may include a microphone 2231 (e.g., the microphone 142 in FIG. 1) disposed on the substrate 223. According to an embodiment, the electronic device 200 may include a battery 222 disposed on the second surface 2212 of the bracket 221, and a speaker 225 (e.g., the speaker 141 in FIG. 1) disposed between the battery 222 and the second case 212 to emit sound through an acoustic passage structure of the second case 212 and the ear tip 230.

According to various embodiments, the antenna carrier 224 may be formed of a dielectric material and may include the first conductive pattern 2241 and the second conductive pattern 2242 formed on its outer surface at a location close to the first case 211 (e.g., touch area TA). According to an embodiment, the first conductive pattern 2241 and the second conductive pattern 2242 may be electrically connected to the substrate 223 through an electrical connection member (e.g., a conductive contact and/or a C-clip) when the antenna carrier 224 is assembled. According to an embodiment, the first conductive pattern 2241 may be electrically connected to a touch sensor module (e.g., the touch sensor IC 132 in FIG. 1) disposed on the substrate 223, thereby being used as a touch pad. According to an embodiment, the first conductive pattern 2241 may be electrically connected to a wireless communication circuit (e.g., the communication module 190 in FIG. 1) disposed on the substrate 223, thereby being used as an antenna configured to transmit or receive a radio signal in a designated frequency band. According to an embodiment, in the internal space 2001 of the housing 210, the antenna carrier 224 may be disposed at a position capable of detecting a user's finger, which contacts or approaches the outer surface (e.g., touch area TA) of the first case 211 of the housing 210, in a capacitive manner through the first conductive pattern 2241. Therefore, at least the touch area of the first case may be formed of a dielectric material. For example, even if the first case 211 is made of a conductor (e.g., a metal material), the touch area TA may be formed of a dielectric material (e.g., a polymer). In this case, the conductor and the dielectric material may be combined through injection. According to an embodiment, the second conductive pattern 2242 may be disposed near the first conductive pattern 2241 in the antenna carrier 224. According to an embodiment, the second conductive pattern 2242 may be disposed, as a dummy pattern, to be electrically disconnected from any surrounding electronic components and/or conductors. In various embodiments, the second conductive pattern 2242 may be disposed to be electrically connected to the ground of the substrate 223. According to an embodiment, the second conductive pattern 2242 may be disposed at a position where it can be capacitively coupled with the first conductive pattern 2241 when touched by a user.

Because the second conductive pattern 2242 is capacitively coupled with the first conductive pattern 2241 upon a touch, the electronic device 200 according to various embodiments of the disclosure can minimize and/or reduce a current path that can be lengthened by a finger (e.g., the electrical length of the antenna unintentionally lengthened by a touch), thereby helping to reduce antenna radiation performance degradation. In addition, through the second conductive pattern 2242, the area affected by the human body is reduced in the touch area TA of the housing 210, thereby helping to reduce radiation performance degradation by inducing a minimum change in dielectric constant from the antenna's perspective.

Figure 5A:
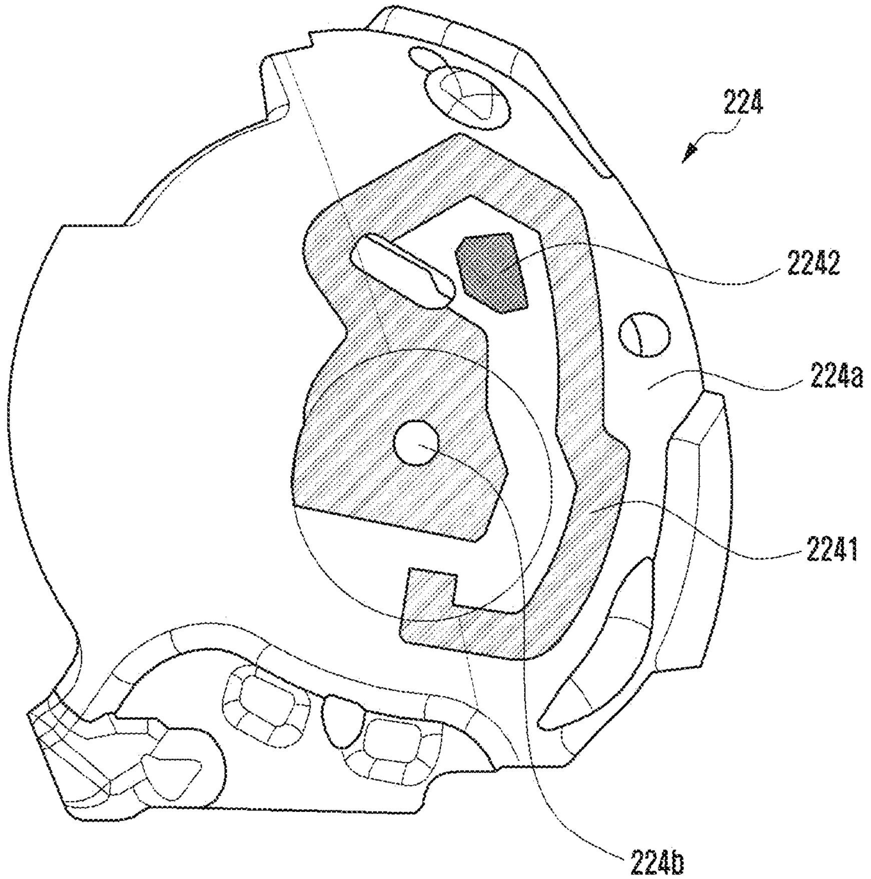
FIG. 5A is a perspective view of an antenna carrier including a first conductive pattern and a second conductive pattern, according to various embodiments.
Figure 5B:
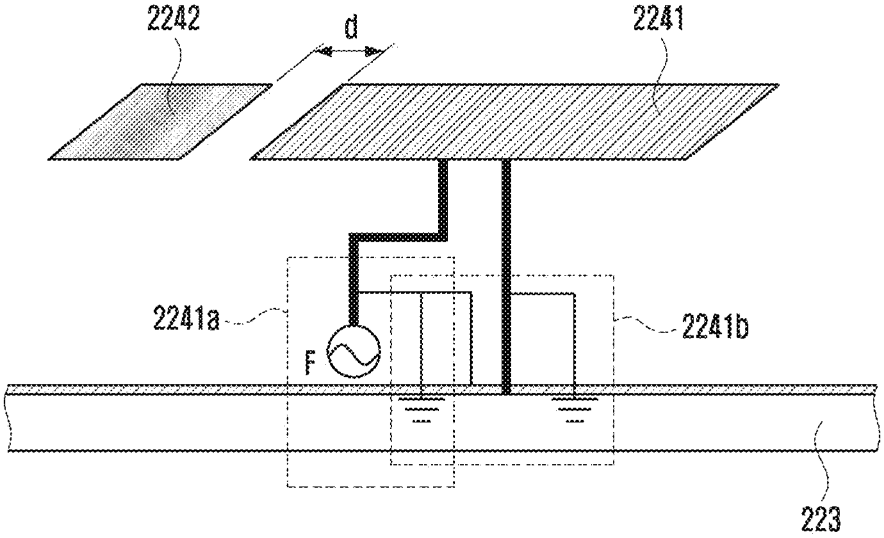
FIG. 5B is a diagram illustrating an example connection structure of a first conductive pattern and a second conductive pattern, according to various embodiments.

FIG. 5A is a perspective view of an antenna carrier including a first conductive pattern and a second conductive pattern, according to various embodiments. FIG. 5B is a diagram illustrating an example connection structure of a first conductive pattern and a second conductive pattern, according to various embodiments.

With reference to FIGS. 5A and 5B, the antenna carrier 224 may be formed of a dielectric material having a specified dielectric constant. According to an embodiment, the first conductive pattern 2241 and/or the second conductive pattern 2242 may be formed on the outer surface 224*a* of the antenna carrier 224 in a manner of a laser direct structuring (LDS) pattern. In this case, the antenna carrier 224 may be electrically connected to a substrate (e.g., the substrate 223 in FIG. 3) disposed thereunder through a conductive via 224*b* formed in the first conductive pattern 2241. According to an embodiment, the first conductive pattern 2241 may be formed in an open loop shape, and the second conductive pattern 2242 may be disposed within a space defined by the open loop shape of the first conductive pattern 2241. In various embodiments, the first conductive pattern 2241 and/or the second conductive pattern 2242 may be formed on the inner surface of the antenna carrier 224, close to the substrate (e.g., the substrate 223 in FIG. 3), thereby helping to improve assemblability. In various embodiments, the first conductive pattern 2241 and/or the second conductive pattern 2242 may be at least partially embedded into the interior of the antenna carrier 224 through injection or structural combination. In various embodiments, the first conductive pattern 2241 and/or the second conductive pattern 2242 may include a conductive plate or a flexible printed circuit board (FPCB) fixed to a corresponding position of the antenna carrier 224 through bonding, taping or fusion. In various embodiments, the electronic device 200 may omit the antenna carrier 224. In this case, the first conductive pattern 2241 and/or the second conductive pattern 2242 may be disposed on the inner surface and/or outer surface of the first case 211 formed of a dielectric material. For example, when the first conductive pattern 2241 and/or the second conductive pattern 2242 are disposed on the outer surface of the first case, the first conductive pattern 2241 and/or the second conductive pattern 2242 may be replaced with a conductive decorative member disposed on the outer surface of the first case 211. In various embodiments, the first conductive pattern 2241 and/or the second conductive pattern 2242 may be formed or disposed directly on the substrate (e.g., the substrate 223 in FIG. 3).

According to various embodiments, the second conductive pattern 2242 may be disposed on the antenna carrier 224 to have a specified separation distance 'd' from the first conductive pattern 2241. In this case, the first conductive pattern 2241 may operate as an antenna (an area 2241*a* in FIG. 5B) by being electrically connected to a wireless communication circuit F (e.g., the communication module 191 in FIG. 1) disposed on the substrate (e.g., the substrate 223 in FIG. 3). According to an embodiment, the second conductive pattern 2242 may operate as a touch pad (an area 2241*b* in FIG. 5B) by being electrically connected to a touch sensor module (e.g., the touch sensor IC 132 in FIG. 1) disposed on the substrate (e.g., the substrate 223 in FIG. 3). According to an embodiment, the second conductive patterns 2242 may be spaced apart from and disposed at a distance that does not affect the radiation performance of the first conductive patterns 2241 when there is no touch input. According to an embodiment, the second conductive pattern 2242 may be capacitively coupled with the first conductive pattern 2241 upon a user's touch, thereby minimizing and/or reducing a current path that can be lengthened by a finger, and thus helping to reduce the radiation performance degradation of the antenna.

Figure 6A:
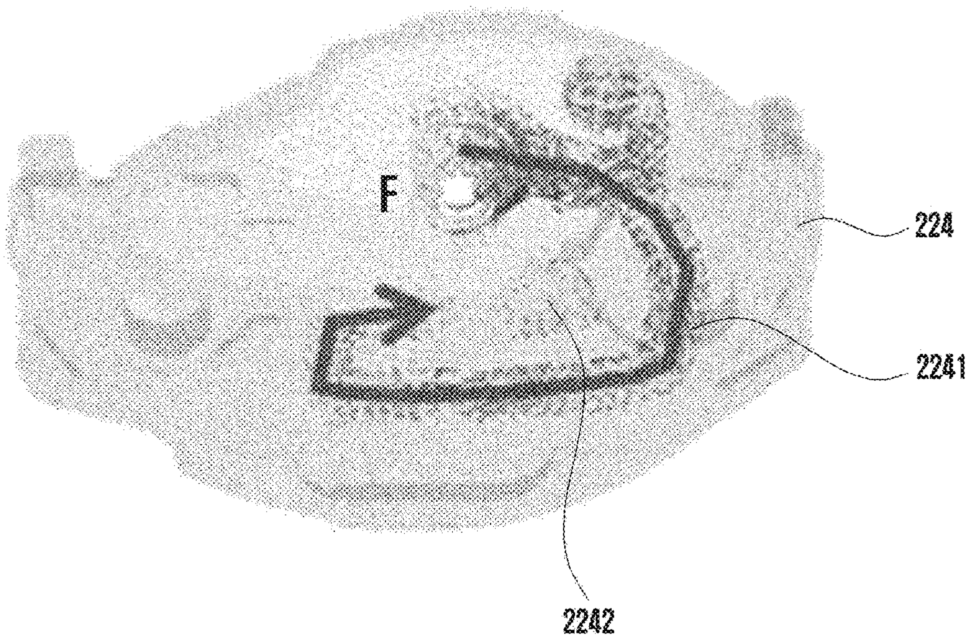
FIGS. 6A and 6B are diagrams illustrating changes in a current path of an antenna before and after contact with the human body, according to various embodiments.
Figure 6B:
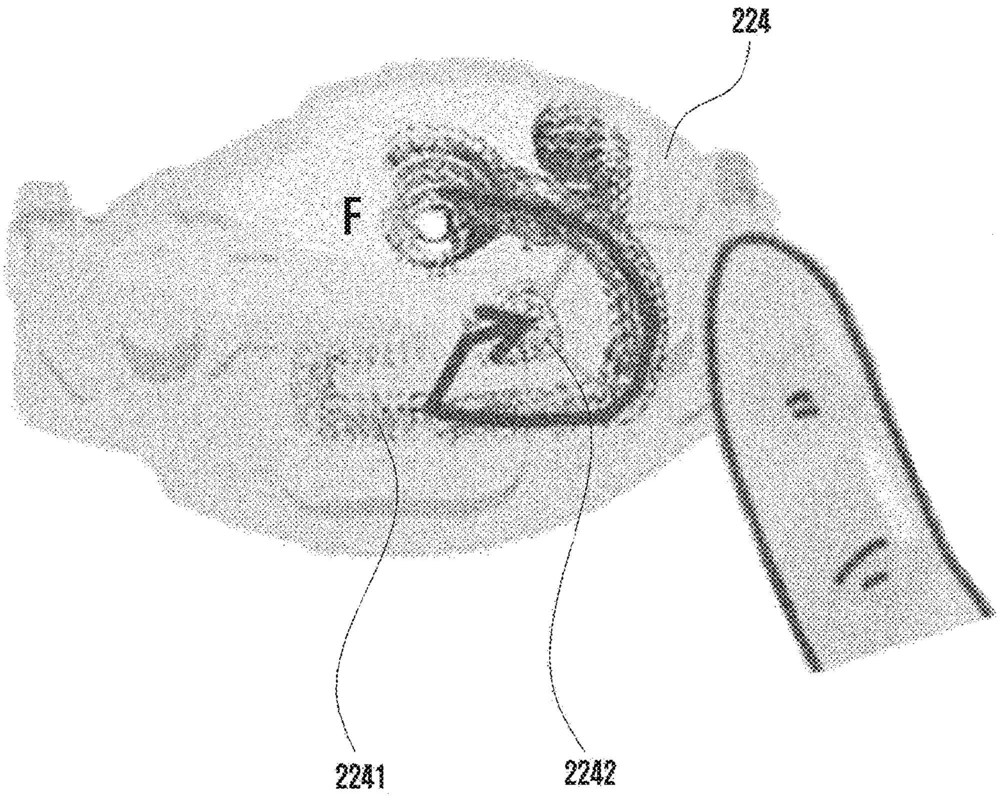

FIGS. 6A and 6B are diagrams illustrating example changes in a current path of an antenna before and after contact with the human body, according to various embodiments.

With reference to FIGS. 6A and 6B, it can be seen that when the second conductive pattern 2242 is disposed near the first conductive pattern 2241 and no touch occurs, the current path is formed normally through the first conductive pattern 2241 (FIG. 6A), and when there is a user's touch, the current path is connected to the second conductive pattern 2242 capacitively coupled by the finger to minimize and/or reduce the current path (FIG. 6B).

Figure 7:
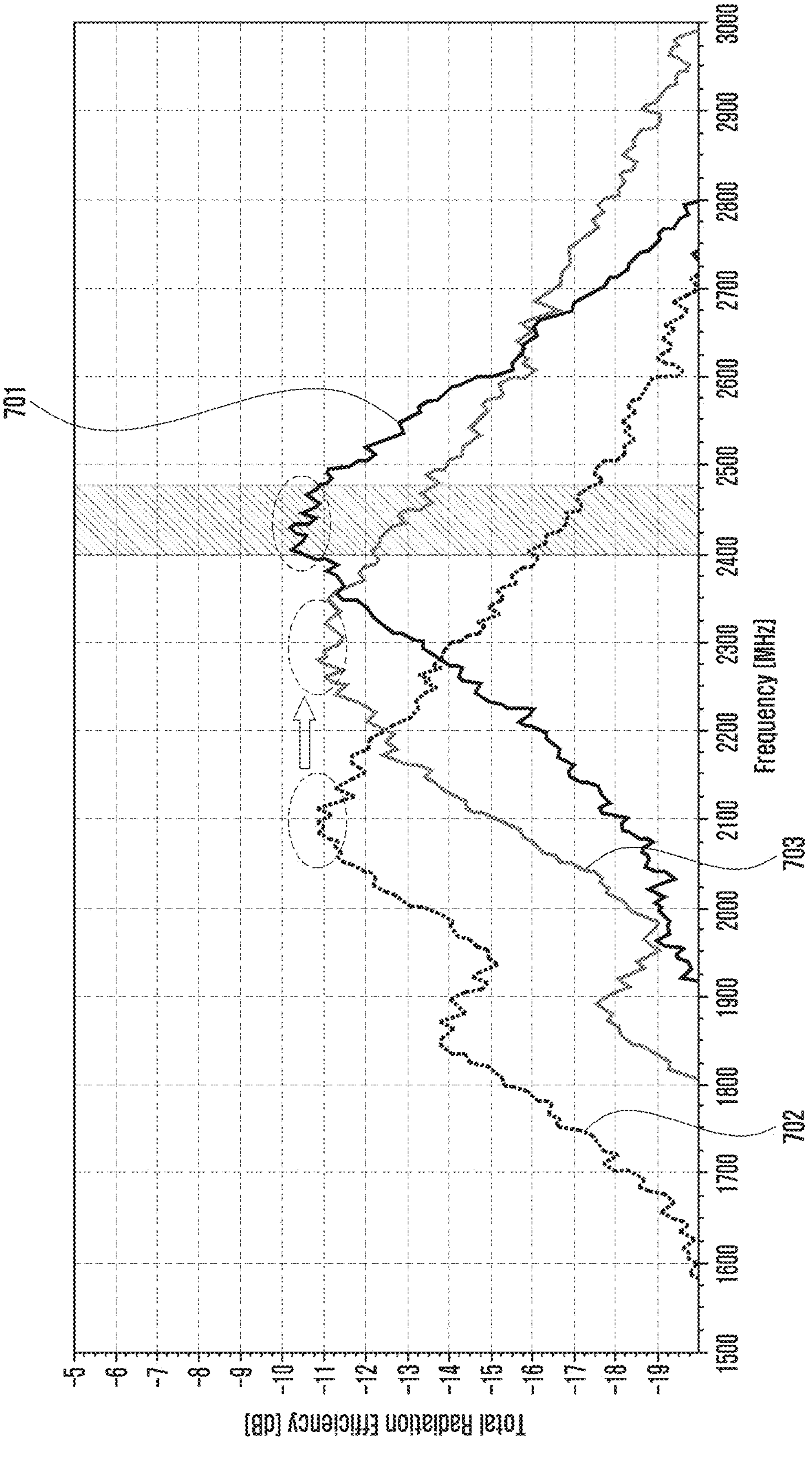
FIG. 7 is a graph showing the comparison of radiation performance of an antenna depending on whether the presence or absence of a second conductive pattern upon contact with the human body, according to various embodiments.

FIG. 7 is a graph showing a comparison of radiation performance of an antenna depending on whether the presence or absence of a second conductive pattern upon contact with the human body, according to various embodiments.

With reference to FIG. 7, when no touch occurs, the antenna using the first conductive pattern 2241 operates in a first frequency band (e.g., approximately 2.4 GHz band) (graph 701). According to an embodiment, it can be seen that when the second conductive pattern 2242 does not exist, the antenna using only the first conductive pattern 2241 operates, upon a touch, in a second frequency band (e.g., approximately 2.1 GHz band) shifted from the first frequency band, thereby causing the radiation performance to deteriorate (graph 702). According to an embodiment, when the second conductive pattern 2242 exists, upon a touch, the first conductive pattern 2241 may operate in a third frequency band (e.g., approximately 2.3 GHz band) close to the first frequency band through a capacitive coupling with the second conductive pattern 2242 (graph 703). This may refer, for example to, upon a touch, the first conductive pattern 2241 being capacitively coupled with the second conductive pattern 2242 and the current path being minimized and/or reduced, thereby reducing the degradation of the antenna's radiation performance.

Figure 8:
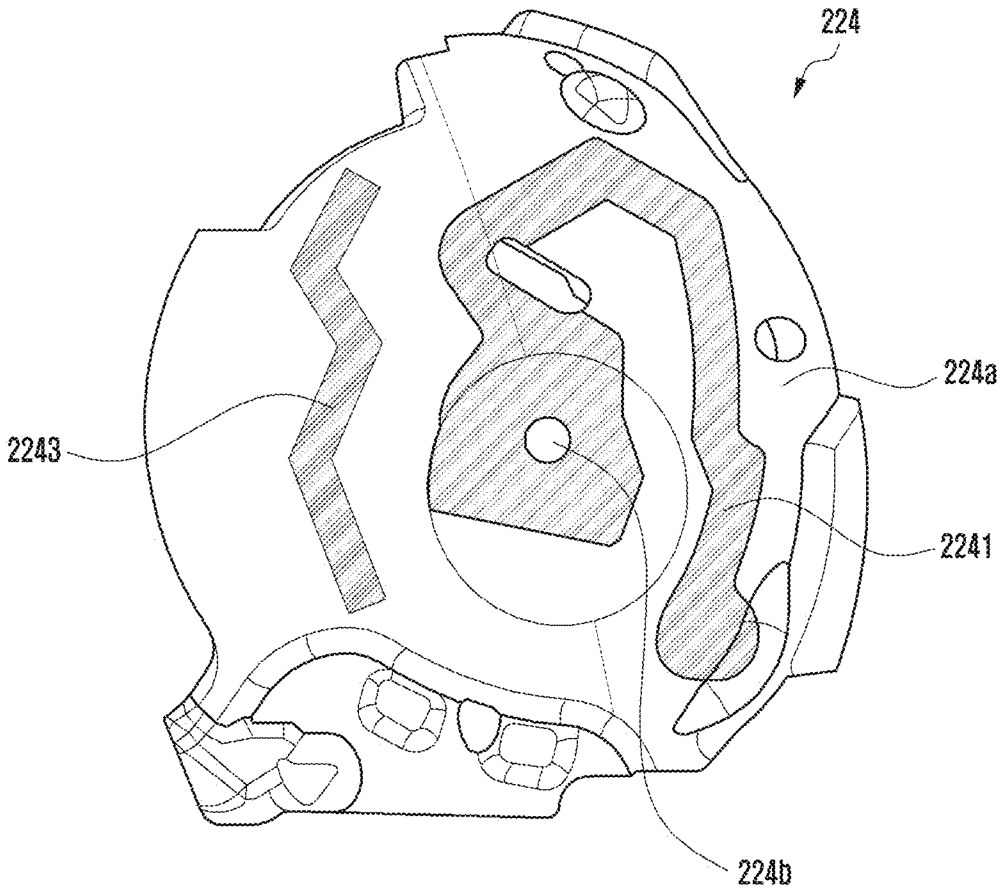
FIG. 8 is a perspective view of an antenna carrier including a first conductive pattern and a second conductive pattern, according to various embodiments.

FIG. 8 is a perspective view of an antenna carrier including a first conductive pattern and a second conductive pattern, according to various embodiments.

In describing the antenna carrier 224 of FIG. 8, components that are substantially the same as those of the antenna carrier 224 of FIG. 5A are given the same reference numerals, and detailed descriptions thereof may be omitted.

With reference to FIG. 8, the antenna carrier 224 may include a first conductive pattern 2241 and a second conductive pattern 2243, which are disposed on the outer surface 224*a*. According to an embodiment, the second conductive pattern 2243 may be disposed outside the first conductive pattern 2241. According to an embodiment, a method of disposing the second conductive pattern 2243 may be substantially the same as that of disposing the second conductive pattern 2242 in FIG. 5A. In this case, the second conductive pattern 2243 may be disposed at a position that does not affect the antenna operation using the first conductive pattern 2241 when there is no touch input. According to an embodiment, the second conductive pattern 2243 may be disposed at a position where it can be capacitively coupled with the first conductive pattern 2241 upon a touch input.

Figure 9:
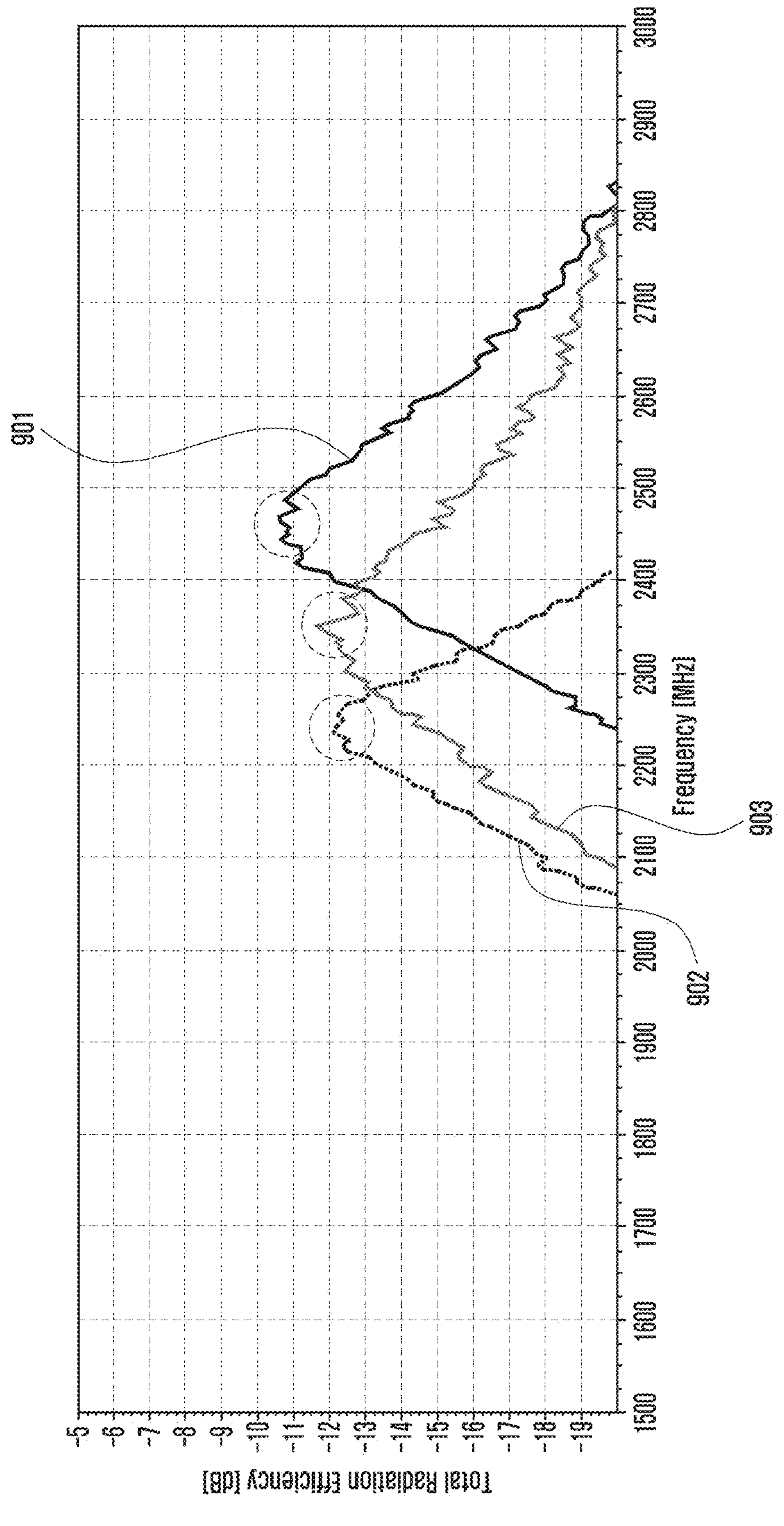
FIG. 9 is a graph showing the comparison of radiation performance of an antenna depending on whether the presence or absence of a second conductive pattern upon contact with the human body in the arrangement structure of FIG. 8, according to various embodiments.

FIG. 9 is a graph showing a comparison of radiation performance of an antenna depending on whether the presence or absence of a second conductive pattern upon contact with the human body in the arrangement structure of FIG. 8, according to various embodiments.

With reference to FIG. 9, when no touch occurs, the antenna using the first conductive pattern 2241 operates in a first frequency band (e.g., approximately 2.45 GHz band) (graph 901). According to an embodiment, it can be seen that when the second conductive pattern 2243 does not exist, the antenna using only the first conductive pattern 2241 operates, upon a touch, in a second frequency band (e.g., approximately 2.25 GHz band) shifted from the first frequency band, thereby causing the radiation performance to deteriorate (graph 902). According to an embodiment, when the second conductive pattern 2243 exists, upon a touch, the first conductive pattern 2241 may operate in a third frequency band (e.g., approximately 2.35 GHz band) close to the first frequency band through a capacitive coupling with the second conductive pattern 2243 (graph 903). This may refer, for example, to, upon a touch, the first conductive pattern 2241 being capacitively coupled with the second conductive pattern 2243 and the current path being minimized and/or reduced, thereby reducing the degradation of the antenna's radiation performance.

Figure 10:
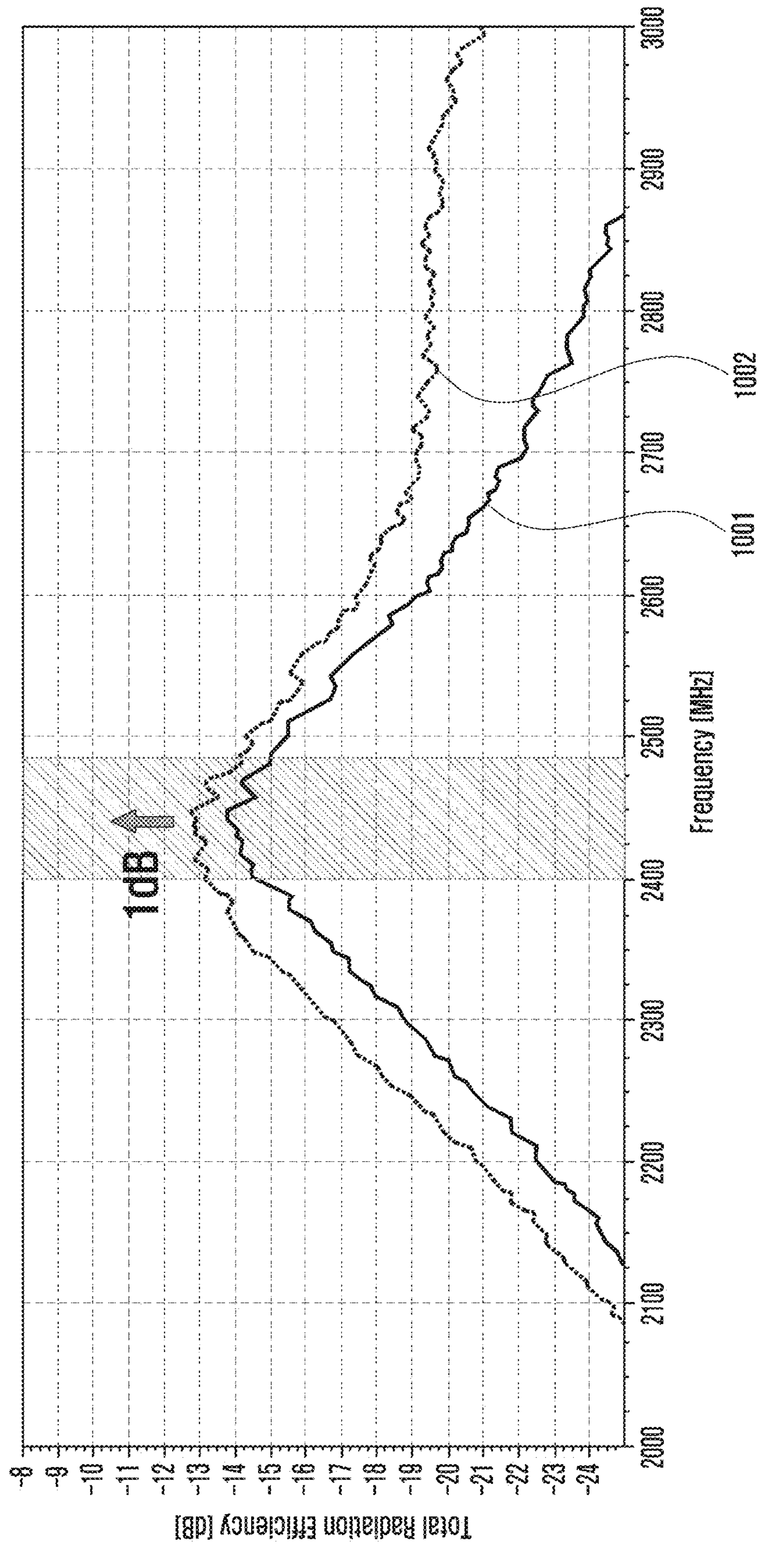
FIG. 10 is a graph showing the comparison of radiation performance of an antenna depending on whether the presence or absence of a second conductive pattern, according to various embodiments.

FIG. 10 is a graph showing a comparison of radiation performance of an antenna depending on whether the presence or absence of a second conductive pattern, according to various embodiments.

With reference to FIG. 10, from the antenna's perspective, when there is a touch for a touch input or when there is proximity or contact with the human body even without a touch input, it can be seen that the gain of the antenna is improved by about 1 dB in a designated frequency band (e.g., about 2.45 GHZ band) in the case where the second conductive pattern 2242 exists and is capacitively coupled with the first conductive pattern 2241 (graph 1002), compared to the case where the second conductive pattern 2242 does not exist (graph 1001).

FIGS. 11A, 11B, 11C, 11D, 11E, 11F, 11G and 11H are diagrams illustrating example arrangement structures of a first conductive pattern and at least one second conductive pattern, according to various embodiments.

In describing FIGS. 11A, 11B, 11C, 11D, 11E, 11F, 11G and 11H (which may be referred to as FIGS. 11A to 11H), at least one second conductive pattern 251, 252, 253, 254, 255, 256, 257, or 258 may be disposed at a position that does not affect the radiation performance of the first conductive pattern 250 when there is no touch, and may be disposed at a position that is capacitively coupled with the first conductive pattern 250 when there is a touch.

Figure 11A:
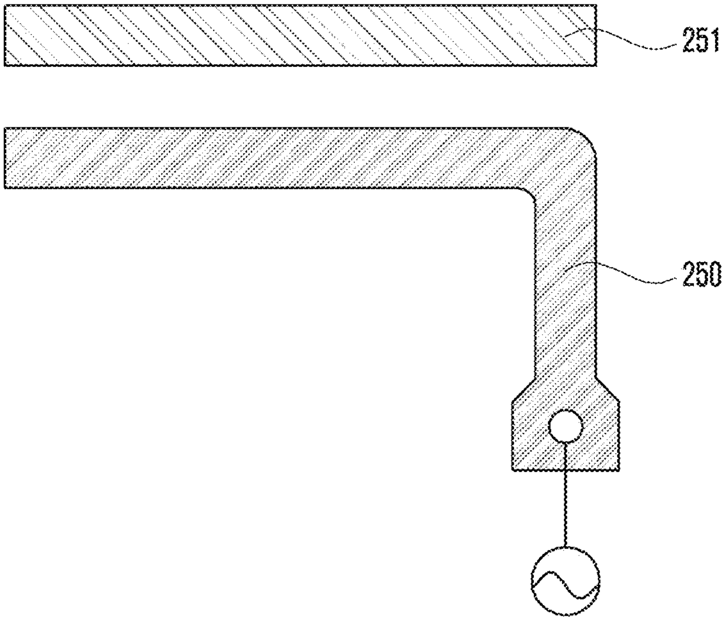
FIGS. 11A, 11B, 11C, 11D, 11E, 11F, 11G and 11H are diagrams illustrating example arrangement structures of a first conductive pattern and at least one second conductive pattern, according to various embodiments.

With reference to FIG. 11A, an antenna carrier (e.g., the antenna carrier 224 in FIG. 5A) may include a first conductive pattern 250 disposed on an outer surface (e.g., the outer surface 224*a* in FIG. 5A), and a second conductive pattern 251 disposed near the first conductive pattern 250. According to an embodiment, the first conductive pattern 250 is formed to have a length and may be electrically connected to a wireless communication circuit (e.g., the communication module 191 in FIG. 1) and a touch sensor module (e.g., the touch sensor IC 132 in FIG. 1) on a substrate (e.g., the substrate 223 in FIG. 3). According to an embodiment, the second conductive pattern 251 may be disposed near the first conductive pattern 250 to have substantially the same length as the first conductive pattern 250.

Figure 11B:
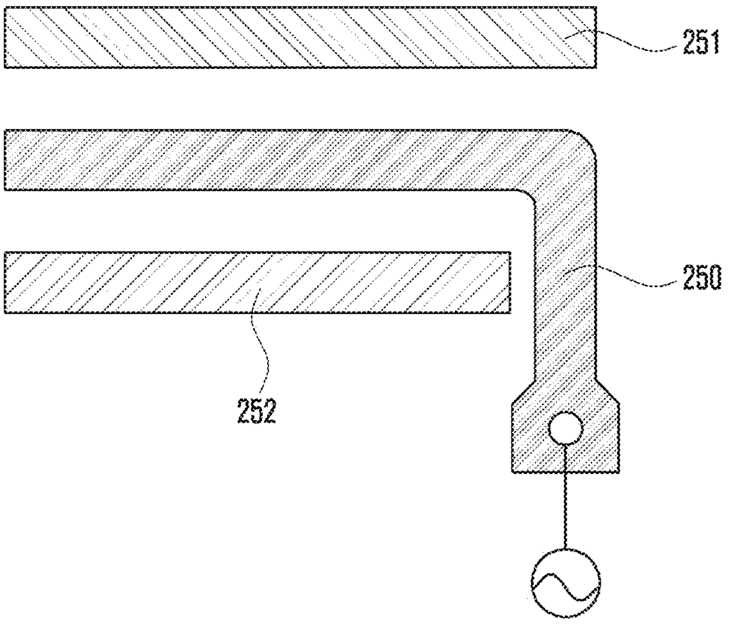

With reference to FIG. 11B, an antenna carrier (e.g., the antenna carrier 224 in FIG. 5A) may include a first conductive pattern 250 and at least one second conductive pattern 251 and 252 disposed near the first conductive pattern 250. According to an embodiment, the at least one second conductive pattern 251 and 252 may include a first sub-pattern 251 disposed on one side of the first conductive pattern 250 and a second sub-pattern 252 disposed on the other side of the first conductive pattern 250. In various embodiments, the at least one second conductive pattern 251 and 252 may include three or more sub-patterns that can be capacitively coupled with the first conductive pattern 250 upon a touch.

Figure 11C:
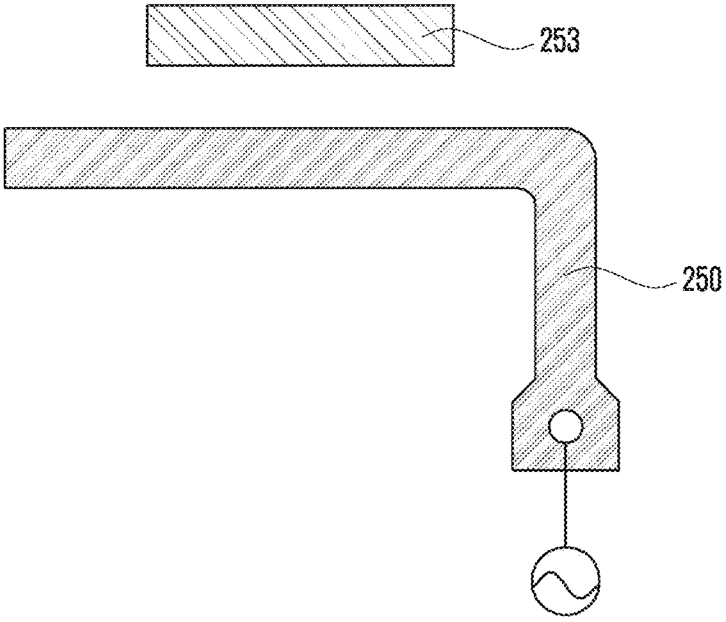

With reference to FIG. 11C, an antenna carrier (e.g., the antenna carrier 224 in FIG. 5A) may include a first conductive pattern 250 and a second conductive pattern 253 disposed near the first conductive pattern 250. In this case, the second conductive pattern 253 may be disposed to have a smaller length than the first conductive pattern 250.

Figure 11D:
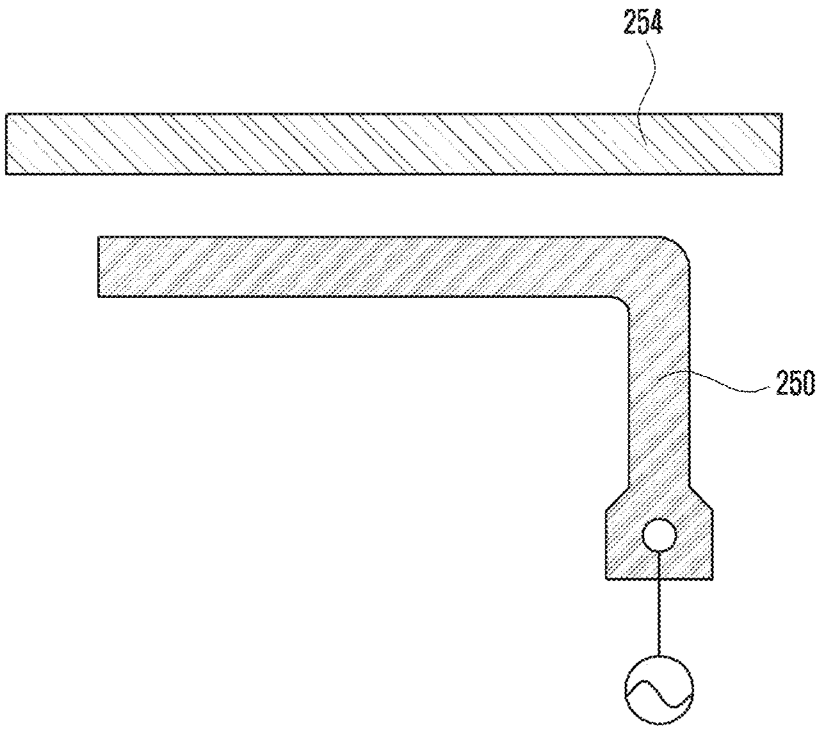

With reference to FIG. 11D, an antenna carrier (e.g., the antenna carrier 224 in FIG. 5A) may include a first conductive pattern 250 and a second conductive pattern 254 disposed near the first conductive pattern 250. In this case, the second conductive pattern 254 may be disposed to have a greater length than the first conductive pattern 250.

Figure 11E:
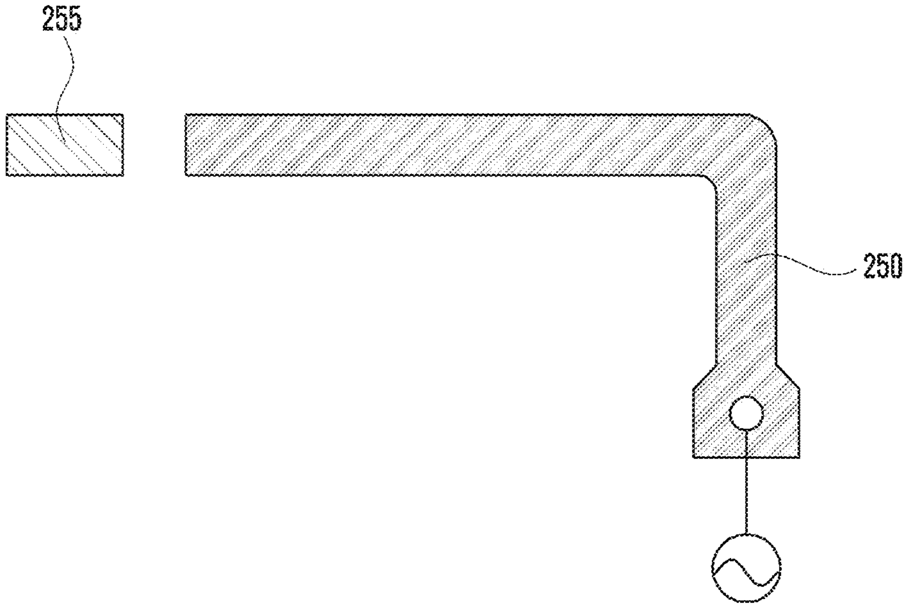

With reference to FIG. 11E, an antenna carrier (e.g., the antenna carrier 224 in FIG. 5A) may include a first conductive pattern 250 and a second conductive pattern 255 disposed near the first conductive pattern 250. In this case, the second conductive pattern 255 may be disposed at the furthest position from a power feeder F of the first conductive pattern 250.

Figure 11F:
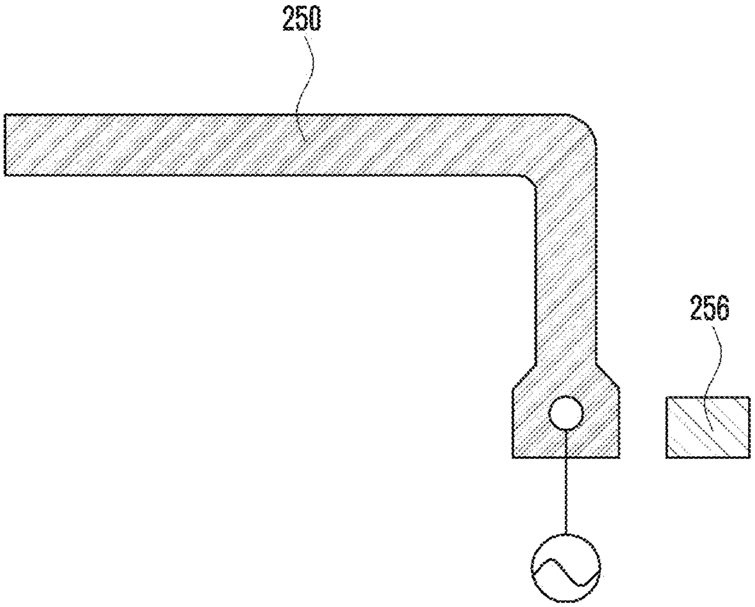

With reference to FIG. 11F, an antenna carrier (e.g., the antenna carrier 224 in FIG. 5A) may include a first conductive pattern 250 and a second conductive pattern 256 disposed near the first conductive pattern 250. In this case, the second conductive pattern 256 may be disposed close to the power feeder F of the first conductive pattern 250.

Figure 11G:
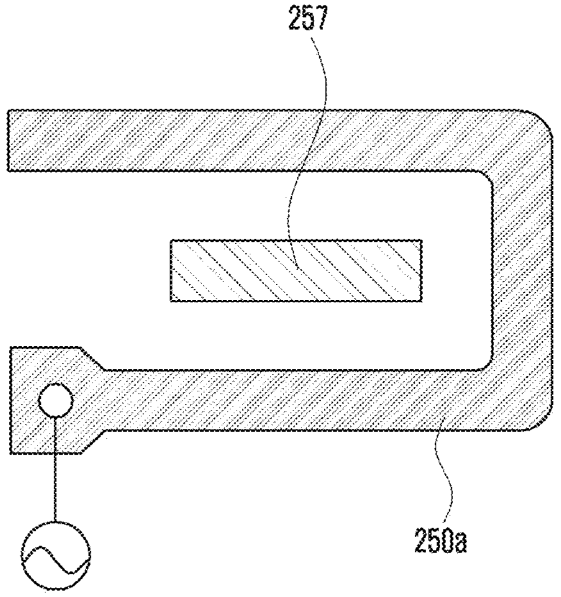

With reference to FIG. 11G, an antenna carrier (e.g., the antenna carrier 224 in FIG. 5A) may include a first conductive pattern 250 and a second conductive pattern 257 disposed near the first conductive pattern 250. In this case, the second conductive pattern 257 may be disposed at a position at least partially surrounded by the first conductive pattern 250 formed in a U-shape.

Figure 11H:
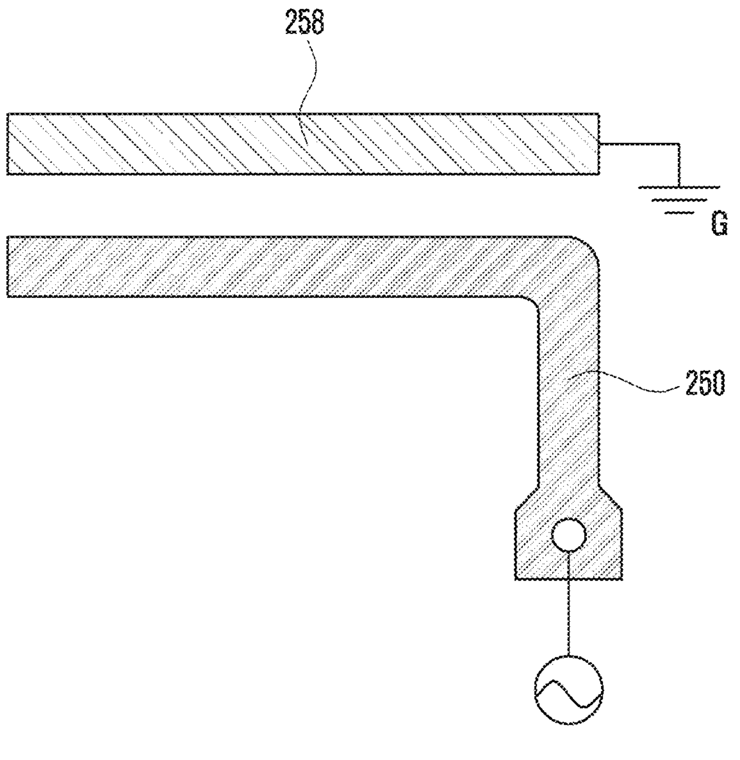

With reference to FIG. 11H, an antenna carrier (e.g., the antenna carrier 224 in FIG. 5A) may include a first conductive pattern 250 and a second conductive pattern 258 disposed near the first conductive pattern 250. In this case, the second conductive pattern 258 may be disposed to be electrically connected to the ground G of a substrate (e.g., the substrate 223 in FIG. 3).

According to various example embodiments, a wearable electronic device (e.g., the wearable electronic device 200 in FIG. 3) includes: a housing (e.g., the housing 210 in FIG. 3), a first conductive pattern (e.g., the first conductive pattern 2241 in FIG. 3) disposed in an internal space (e.g., the internal space 2001 in FIG. 4) of the housing, at least one second conductive pattern (e.g., the second conductive pattern 2242 in FIG. 3) disposed within a specified distance of the first conductive pattern, a wireless communication circuit (e.g., the communication module 191 in FIG. 1) disposed in the internal space and configured to transmit and/or receive a radio signal in a designated frequency band through the first conductive pattern, and a touch sensor module comprising touch sensing circuitry (e.g., the touch sensor IC 132 in FIG. 1) disposed in the internal space and configured to detect a touch on the housing through the first conductive pattern, wherein the second conductive pattern may be disposed at a position capable of being capacitively coupled with the first conductive pattern upon the touch.

According to various example embodiments, the wearable electronic device may further include a substrate disposed in the internal space of the housing, and an antenna carrier stacked on the substrate, wherein the first conductive pattern and/or the at least one second conductive pattern may be disposed on the antenna carrier.

According to various example embodiments, the first conductive pattern and/or the at least one second conductive pattern may be formed on an outer surface of the antenna carrier by a laser direct structuring (LDS) pattern, or may include at least one of a conductive plate or a flexible printed circuit board (FPCB) attached to the outer surface of the antenna carrier.

According to various example embodiments, the first conductive pattern and/or the at least one second conductive pattern may be disposed on an inner surface of the housing.

According to various example embodiments, the wearable electronic device may further include a substrate disposed in the internal space, and the first conductive pattern and/or the at least one second conductive pattern may be disposed on the substrate.

According to various example embodiments, the first conductive pattern may be formed in an open loop shape, and the at least one second conductive pattern may be disposed within a space defined by the open loop shape.

According to various example embodiments, the at least one second conductive pattern may be disposed on one side of the first conductive pattern.

According to various example embodiments, the at least one second conductive pattern may be electrically connected to a ground of the electronic device.

According to various example embodiments, the wearable electronic device may further include a speaker disposed in the internal space configured to emit a sound generated from the speaker to an outside through an ear tip disposed in the housing.

According to various example embodiments, the wearable electronic device may include an ear wearable electronic device in which at least a portion of the ear tip is configured to inserted into a user's ear.

According to various example embodiments, a wearable electronic device (e.g., the wearable electronic device 200 in FIG. 3) may include: a housing (e.g., the housing 210 in FIG. 3) including a first case (e.g., the first case 211 in FIG. 3) and a second case (e.g., the second case 212 in FIG. 3) combined with the first case, a substrate (e.g., the substrate 223 in FIG. 3) disposed in an internal space (e.g., the internal space 2001 in FIG. 4) of the housing, an antenna carrier (e.g., the antenna carrier 224 in FIG. 3) disposed between the substrate and the first case in the internal space, a first conductive pattern (e.g., the first conductive pattern 2241 in FIG. 3) disposed on the antenna carrier, at least one second conductive pattern (e.g., the second conductive pattern 2242 in FIG. 3) disposed within a specified distance of the first conductive pattern on the antenna carrier, a wireless communication circuit (e.g., the communication module 191 in FIG. 1) disposed on the substrate and configured to transmit and/or receive a radio signal in a designated frequency band through the first conductive pattern, and a touch sensor module comprising touch sensing circuitry (e.g., the touch sensor IC 132 in FIG. 1) disposed on the substrate and configured to detect a touch on the first case through the first conductive pattern, wherein the second conductive pattern may be disposed at a position capable of being capacitively coupled with the first conductive pattern upon the touch.

According to various example embodiments, the first conductive pattern and/or the at least one second conductive pattern may be formed on an outer surface of the antenna carrier by a laser direct structuring (LDS) pattern, or may include at least one of a conductive plate or a flexible printed circuit board (FPCB) attached to the outer surface of the antenna carrier.

According to various example embodiments, the first conductive pattern may be formed in an open loop shape, and the at least one second conductive pattern may be disposed within a space defined by the open loop shape.

According to various example embodiments, the at least one second conductive pattern may be disposed on one side of the first conductive pattern.

According to various example embodiments, the at least one second conductive pattern may be electrically connected to a ground of the electronic device.

According to various example embodiments, the wearable electronic device may further include a speaker disposed in the internal space, and configured to emit a sound generated from the speaker to an outside through an ear tip combined with the second case.

According to various example embodiments, the wearable electronic device may include an ear wearable electronic device in which at least a portion of the ear tip is configured to be inserted into a user's ear.

According to various example embodiments, a wearable electronic device (e.g., the wearable electronic device 200 in FIG. 3) may include: a housing (e.g., the housing 210 in FIG. 3), a first conductive pattern (e.g., the first conductive pattern 2241 in FIG. 3) disposed in an internal space (e.g., the internal space 2001 in FIG. 4) of the housing, at least one second conductive pattern (e.g., the second conductive pattern 2242 in FIG. 3) disposed within a specified distance of the first conductive pattern, and a wireless communication circuit (e.g., the communication module 191 in FIG. 1) disposed in the internal space and configured to transmit and/or receive a radio signal in a designated frequency band through the first conductive pattern, wherein the second conductive pattern may be disposed at a position capable of being capacitively coupled with the first conductive pattern based on a human body contacting or approaching the housing.

According to various example embodiments, the at least one second conductive pattern may be electrically connected to a ground of the electronic device.

According to various example embodiments, the wearable electronic device may further include a speaker disposed in the internal space, and an ear tip combined with the housing and configured to emit a sound generated from the speaker to an outside, and the wearable electronic device may include an ear wearable electronic device in which at least a portion of the ear tip is configured to be inserted into a user's ear.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device comprising:
- a housing;
- a first conductive pattern disposed in an internal space of the housing;
- at least one second conductive pattern;
- a wireless communication circuit disposed in the internal space and configured to transmit and/or receive a radio signal in a designated frequency band through the first conductive pattern; and
- a touch sensor disposed in the internal space and configured to detect a touch on the housing through the first conductive pattern,
- wherein the first conductive pattern is formed in an open loop shape, and the at least one second conductive pattern is disposed within a space defined by the open loop shape, and
- wherein the at least one second conductive pattern is disposed at a position capable of being capacitively coupled with the first conductive pattern upon the touch.

2. The wearable electronic device of claim 1, further comprising:
- a substrate disposed in the internal space of the housing; and
- an antenna carrier stacked on the substrate,
- wherein the first conductive pattern and/or the at least one second conductive pattern are disposed on the antenna carrier.

3. The wearable electronic device of claim 2, wherein the first conductive pattern and/or the at least one second conductive pattern are formed on an outer surface of the antenna carrier by a laser direct structuring (LDS) pattern, or include at least one of a conductive plate or a flexible printed circuit board (FPCB) attached to the outer surface of the antenna carrier.

4. The wearable electronic device of claim 1, wherein the first conductive pattern and/or the at least one second conductive pattern are disposed on an inner surface of the housing.

5. The wearable electronic device of claim 1, further comprising:
- a substrate disposed in the internal space,
- wherein the first conductive pattern and/or the at least one second conductive pattern are disposed on the substrate.

6. The wearable electronic device of claim 1, wherein the at least one second conductive pattern is disposed on one side of the first conductive pattern.

7. The wearable electronic device of claim 1, wherein the at least one second conductive pattern is electrically connected to a ground of the wearable electronic device.

8. The wearable electronic device of claim 1, further comprising:
- a speaker disposed in the internal space,
- wherein the speaker is configured to emit a sound generated from the speaker to an outside through an ear tip disposed in the housing.

9. The wearable electronic device of claim 8, wherein the wearable electronic device includes an ear wearable electronic device in which at least a portion of the ear tip is configured to be inserted into a user's ear.

10. A wearable electronic device comprising:
- a housing including a first case and a second case combined with the first case;
- a substrate disposed in an internal space of the housing;
- an antenna carrier disposed between the substrate and the first case in the internal space;
- a first conductive pattern disposed on the antenna carrier;
- at least one second conductive pattern disposed on the antenna carrier;
- a wireless communication circuit disposed on the substrate and configured to transmit and/or receive a radio signal in a designated frequency band through the first conductive pattern; and
- a touch sensor disposed on the substrate and configured to detect a touch on the first case through the first conductive pattern,
- wherein the first conductive pattern is formed in an open loop shape, and the at least one second conductive pattern is disposed within a space defined by the open loop shape, and
- wherein the at least one second conductive pattern is disposed at a position capable of being capacitively coupled with the first conductive pattern upon the touch.

11. The wearable electronic device of claim 10, wherein the first conductive pattern and/or the at least one second conductive pattern are formed on an outer surface of the antenna carrier by a laser direct structuring (LDS) pattern, or include at least one of a conductive plate or a flexible printed circuit board (FPCB) attached to the outer surface of the antenna carrier.

12. The wearable electronic device of claim 10, wherein the at least one second conductive pattern is disposed on one side of the first conductive pattern.

13. The wearable electronic device of claim 10, wherein the at least one second conductive pattern is electrically connected to a ground of the wearable electronic device.

14. The wearable electronic device of claim 10, further comprising a speaker disposed in the internal space,
- wherein a sound generated from the speaker is configured to be emitted to an outside through an ear tip combined with the second case.

15. The wearable electronic device of claim 10, wherein the wearable electronic device includes an ear wearable electronic device in which at least a portion of an ear tip is inserted into a user's ear.

16. A wearable electronic device comprising:
- a housing;
- a first conductive pattern disposed in an internal space of the housing;
- at least one second conductive pattern; and a wireless communication circuit disposed in the internal space and configured to transmit and/or receive a radio signal through the first conductive pattern, wherein the first conductive pattern is formed in an open loop shape, and the at least one second conductive pattern is disposed within a space defined by the open loop shape, and wherein the at least one second conductive pattern is disposed at a position capable of being capacitively coupled with the first conductive pattern when a human body contacts or approaches the housing.

17. The wearable electronic device of claim 16, wherein the at least one second conductive pattern is electrically connected to a ground of the wearable electronic device.

18. The wearable electronic device of claim 16, further comprising:

a speaker disposed in the internal space, and an ear tip combined with the housing and emitting a sound generated from the speaker to an outside, wherein the wearable electronic device includes an ear wearable electronic device in which at least a portion of the ear tip is inserted into a user's ear.

* * * * *